United States Patent
Yiu et al.

(10) Patent No.: US 12,553,997 B2
(45) Date of Patent: Feb. 17, 2026

(54) SPATIAL COMPOUNDED HARMONIC IMAGING FOR MEDICAL ULTRASOUND APPLICATIONS

(71) Applicant: Monolithic Power Systems, Inc., San Jose, CA (US)

(72) Inventors: Yat Shun Yiu, Waterloo (CA); Adrian J. Y. Chee, Toronto (CA); Chung Ping Cheung, Burnaby (CA)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 18/787,104

(22) Filed: Jul. 29, 2024

(65) Prior Publication Data
US 2026/0029519 A1    Jan. 29, 2026

(51) Int. Cl.
*G01S 7/52* (2006.01)
(52) U.S. Cl.
CPC ...... *G01S 7/52026* (2013.01); *G01S 7/52044* (2013.01); *G01S 7/52046* (2013.01)
(58) Field of Classification Search
CPC ............ G01S 7/52026; G01S 7/52044; G01S 7/52046
See application file for complete search history.

(56) References Cited

U.S. PATENT DOCUMENTS

| | | | |
|---|---|---|---|
| 8,212,604 B2 | 7/2012 | Dianbo | |
| 9,401,659 B2 | 7/2016 | Lei et al. | |
| 2014/0125402 A1 | 5/2014 | Chen | |
| 2015/0289837 A1* | 10/2015 | Kim | A61B 8/488 600/454 |
| 2015/0293062 A1* | 10/2015 | Kim | G01S 15/8995 73/597 |
| 2015/0320397 A1* | 11/2015 | Takagi | A61B 8/5207 600/437 |
| 2016/0199038 A1* | 7/2016 | Tsushima | A61B 8/4494 600/443 |
| 2016/0278742 A1* | 9/2016 | Tsushima | G01S 7/52046 |
| 2017/0128038 A1* | 5/2017 | Tsushima | A61B 8/5207 |
| 2018/0011178 A1* | 1/2018 | Tsushima | A61B 8/14 |

(Continued)

OTHER PUBLICATIONS

"AFE5832LP 32-Channel Ultrasound AFE With 18.5-mW/Channel Power, 4-nV/√Hz, 12-Bit, 40-MSPS or 10-Bit, 50-MSPS Output and Passive CW Mixer", Texas Instruments, Dec. 2018.

(Continued)

*Primary Examiner* — Dixomara Vargas
(74) *Attorney, Agent, or Firm* — Beyer Law Group LLP (57) ABSTRACT

A portable ultrasound imaging system includes a probe and a personal computer. The personal computer is connected to the probe by way of a THUNDERBOLT I/O interface. The probe includes a transducer that alternately transmits positive and negative ultrasound pulses to a target being imaged, which is a human body. Echoes of the ultrasound pulses reflected from internal structures of the human body are sampled from the transducer, digitized into echo data, and streamed to the personal computer over the THUNDERBOLT I/O interface. In the personal computer, scanlines are generated from the echo data. Overlapping scanlines are coherently compounded and positioned together to form an ultrasound image.

10 Claims, 9 Drawing Sheets

(56) References Cited

U.S. PATENT DOCUMENTS

2018/0284251 A1* 10/2018 Labyed ............... G01S 7/52042
2023/0099970 A1* 3/2023 Luo ..................... G01S 7/52063
                                                      600/443

OTHER PUBLICATIONS

Libertario Demi, "Practice Guide to Ultrasound Beam Forming; Beam Pattern and Image Reconstruction Analysis", Applied Sciences, Department of Information Engineering and Computer Science, University of Trento, Sep. 3, 2018.
"Beamforming", Wikipedia, https://en.wikipedia.org/wiki/Beamforming, Downloaded Jul. 17, 2024.
"Ultrasound Computer Tomography", Wikipedia, https://en.wikipedia.org/wiki/Ultrasound_computer_tomography, Downloaded Jul. 17, 2024.
Craig Hacking, "Beam Focusing", Radiopaedia, https://radiopaedia.org/articles/beam-focusing?lang=us, Last revised May 21, 2020, Downloaded Jul. 24, 2024.
TX7332 Three-Level, 32-Channel Transmitter With 1.2-A Pulser, T/R Switch, and Integrated Transmit Beamformer, Texas Instruments, Mar. 2019.

* cited by examiner

SPATIAL COMPOUNDED HARMONIC IMAGING FOR MEDICAL ULTRASOUND APPLICATIONS

TECHNICAL FIELD

The present disclosure is directed to medical ultrasound imaging.

BACKGROUND

In medical ultrasound applications, an ultrasound image of an internal body organ or other structure is acquired using an ultrasound imaging system. An ultrasound imaging system works by transmitting ultrasound pulses toward a human body, receiving echoes of the ultrasound pulses that reflect back from internal structures of the human body, and processing the echoes to create a corresponding ultrasound image. Ultrasound imaging systems come in different form factors, including cart-based and portable. In general, the smaller the form factor, the less capable the ultrasound imaging system is. Also, ultrasound imaging systems are relatively expensive, especially those capable of generating high resolution ultrasound images.

BRIEF SUMMARY

In one embodiment, a portable ultrasound imaging system includes a probe and a personal computer. The personal computer is connected to the probe by way of a THUNDERBOLT I/O interface. The probe includes a transducer that alternately transmits positive and negative ultrasound pulses to a target being imaged, which is a human body. Echoes of the ultrasound pulses reflected from internal structures of the human body are sampled from the transducer, digitized into echo data, and streamed to the personal computer over the THUNDERBOLT I/O interface. In the personal computer, scanlines are generated from the echo data. Overlapping scanlines are coherently compounded and positioned together to form an ultrasound image.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, structures, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
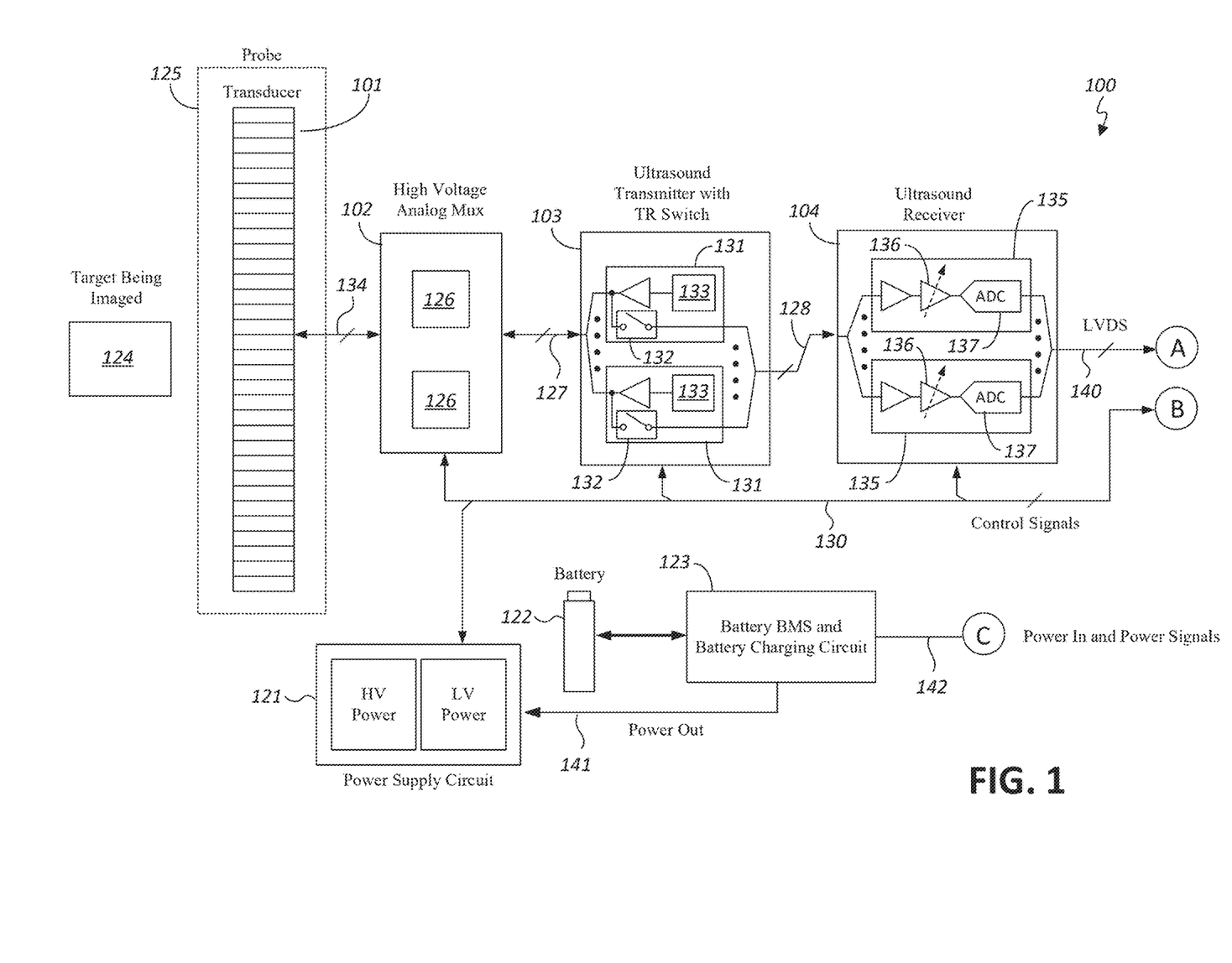
FIGS. 1 and 2 show a block diagram of an ultrasound imaging system, in accordance with an embodiment of the present invention.
Figure 2:
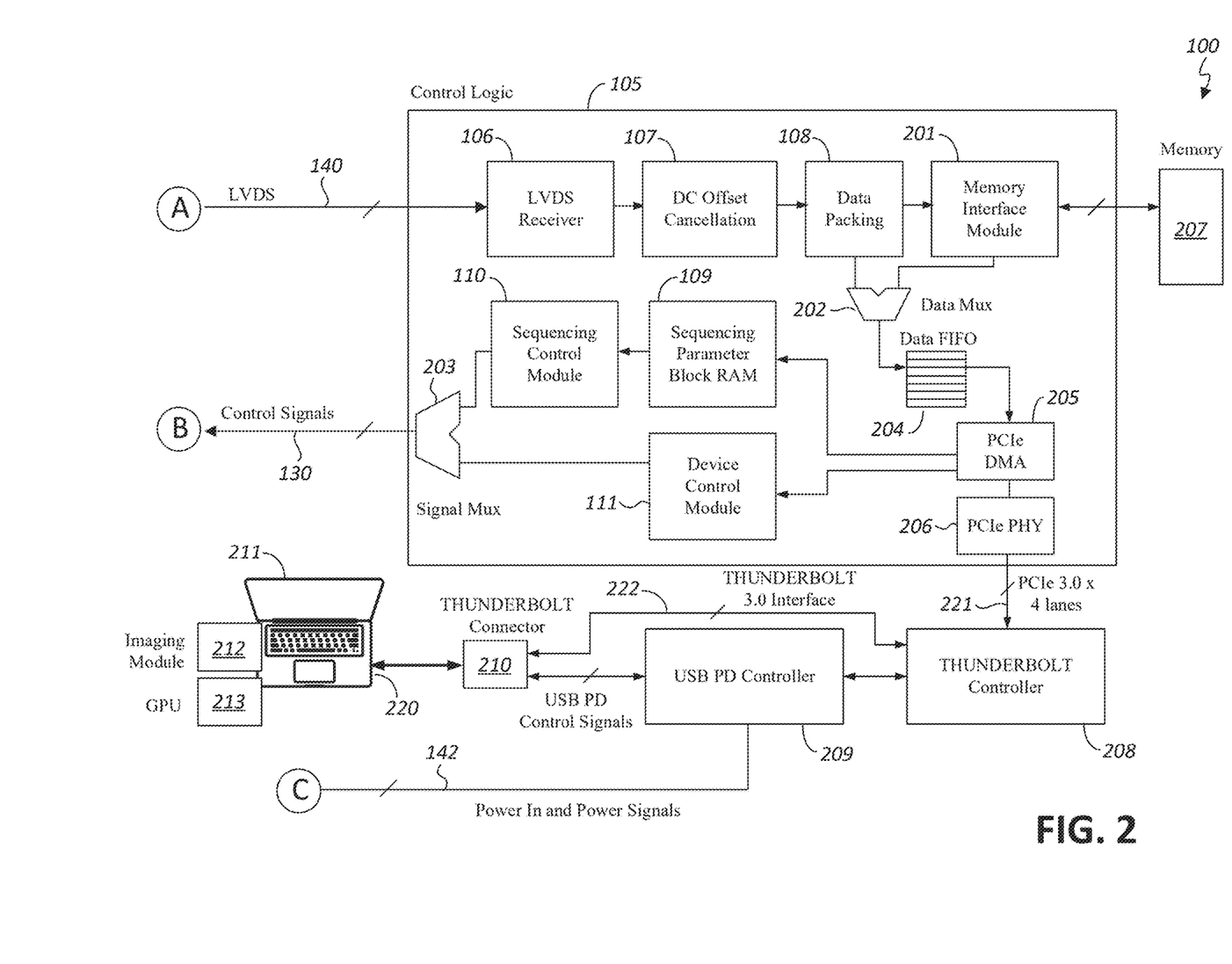

FIGS. 1 and 2 show a block diagram of an ultrasound imaging system 100, in accordance with an embodiment of the present invention. Nodes that are labeled A, B, and C in FIG. 1 connect to the same labeled nodes in FIG. 2.

Referring to FIG. 1, the ultrasound imaging system 100 includes a probe 125 that is placed on a target (see FIG. 1, 124) being imaged, which in one embodiment is a human body. The probe 125 includes a transducer 101. In one embodiment, the transducer 101 is a piezoelectric transducer with 128 or 192 elements. A transducer element, when excited, emits an ultrasound pulse toward the human body. In one embodiment, alternating positive and negative ultrasound pulses are emitted toward the human body. A positive ultrasound pulse is at a fundamental frequency, and the negative ultrasound pulse is an inverted version of the positive ultrasound pulse. As the ultrasound pulses travel through the human body, nonlinear interactions with structures within the human body generate harmonic frequencies. Echoes of the ultrasound pulses reflected from within the human body return to elements of the transducer 101, digitized into echo data, and streamed to a personal computer 211 (shown in FIG. 2) where the echo data are processed to generate an ultrasound image.

In the example of FIG. 1, excitation signals are sent to and echoes are received from the elements of the transducer 101 by way of a high voltage analog multiplexer 102. Although an echo is a relatively weak signal, the excitation signal is a high voltage signal and thus requires a multiplexer that can handle high voltages. The analog multiplexer 102 connects channels of the ultrasound transmitter 103 to corresponding elements of the transducer 101, and connects elements of the transducer 101 to corresponding channels of the ultrasound receiver 104. The analog multiplexer 102 thus allows a channel of the ultrasound transmitter 103 to send an excitation signal to a particular transducer element, and a channel of the ultrasound receiver 104 to sample an echo from a particular transducer element. Control signals (see FIG. 1, 130) from a control logic 105 (shown in FIG. 2) control the multiplexing operations of the analog multiplexer 102.

In one embodiment, the analog multiplexer 102 is implemented using modules 126, with each module 126 being an MP4895A multiplexer from Monolithic Power Systems, Inc. The MP4895A multiplexer is a 96-channel, 1:3 multiplexer. Two MP4895A multiplexers may be used to multiplex 64-channels of the ultrasound transmitter 103 (see FIGS. 1, 127) and 64-channels of the ultrasound receiver 104 (FIG. 1, 128) to a 192-element or 128-element transducer 101 (see FIG. 1, 134).

The ultrasound transmitter 103 comprises a plurality of transmitter channels, with each channel transmitting an excitation signal to an element of the transducer 101. Each transmitter channel includes a pulser 133 for generating an excitation signal that causes a transducer element to generate an ultrasound pulse, and a transmit/receive (TR) switch 132 for placing the transmitter channel into transmit mode for transmitting an excitation signal to a transducer element or into receive mode for routing an echo sampled from a transducer element into a channel of the ultrasound receiver 104. Control signals (see FIG. 1, 130) from the control logic 105 control the pulsing and TR switching of individual channels. In one embodiment, the ultrasound transmitter 103 is implemented using modules 131, with each module 131 being a 32-channel ultrasound transmitter with built-in transmit beamformer and with integrated TR switches. Two modules 131 may be used to form a 64-channel ultrasound transmitter.

The ultrasound receiver 104 comprises a plurality of receiver channels, with each channel receiving an echo that is sampled from an element of the transducer 101. Each receiver channel includes a time gain compensation (TGC) circuit 136 for adjusting the amplification of the echo for different depths, and an analog-to-digital converter (ADC) 137 for converting the echo into a digital signal. In one embodiment, the digitized echoes, which are also referred to herein as echo data, are transmitted from the ultrasound receiver 104 to the control logic 105 by low voltage differential signaling (LVDS) (see FIG. 1, 140). Control signals (see FIG. 1, 130) from the control logic 105 control the TGC amplification and other operations of the ultrasound receiver 104.

In one embodiment, the ultrasound receiver 104 is implemented using modules 135, with each module 135 being an analog front-end (AFE) module that has 32 receiver channels with built-in digital TGC, and a built-in ADC that is capable of 40 MSPS and 14-bit resolution. Two modules 135 may be used to form a 64-channel ultrasound receiver. The LVDS outputs of the modules 135 are connected to the control logic 105 (see FIG. 1, 140).

In the example of FIG. 1, a battery module 123 includes a battery management system (BMS) and a charging circuit, which charges a battery 122 (e.g., Li-Ion battery) and provides input power (see FIG. 1, 141) to a power supply circuit 121. The power supply circuit 121 generates high voltage power and low voltage power to components of the ultrasound imaging system 100 in accordance with control signals from the control logic 105, such as to adjust the high voltage output to the ultrasound transmitter 103 and to disable and enable low voltage power for power saving. A Universal Serial Bus (USB) Power Delivery (PD) controller 209 (shown in FIG. 2) interfaces with the personal computer 211, negotiates the power required, and charges the battery 122 (see FIG. 1, 142).

Referring to FIG. 2, the control logic 105 is configured to send control signals to the high voltage analog multiplexer 102, ultrasound transmitter 103, ultrasound receiver 104, and the power supply circuit 121 to send excitation signals to and receive corresponding echoes from the transducer 101 (shown in FIG. 1); receive LVDS signals carrying echo data from the ultrasound receiver 104; and stream the echo data to a personal computer 211 over a THUNDERBOLT I/O interface. In one embodiment, the control logic 105 is implemented using the Aritx UltraScale+Field Programmable Gate Array (FPGA) from Advanced Micro Devices (AMD).

An imaging module 212 comprises software that runs on the personal computer 211 to process the echo data to generate an ultrasound image, for example by spatial compounded harmonic imaging. The personal computer 211 includes a graphics processing unit (GPU) 213 that facilitates generation of the ultrasound image. The personal computer 211 may be a laptop or other personal computer. The use of a personal computer 211, instead of a dedicated computer, advantageously allows the ultrasound imaging system 100 to be upgraded as cheaper and more powerful personal computers become commercially available. Also, the personal computer 211 itself is upgradeable, allowing the GPU 213 to be replaced by more powerful GPUs or another hardware accelerator. Furthermore, the personal computer 211 may be a laptop computer, which makes the ultrasound imaging system 100 portable.

Generally, an ultrasound imaging system needs to be able to generate ultrasound images in real time. A hurdle in using a personal computer, instead of a dedicated computer, to perform ultrasound imaging is the relatively slow data transfer speed over the typical input/output (I/O) interface of a personal computer. However, the inventors believe that the THUNDERBOLT 3.0 I/O interface has sufficient data transfer speed for real time ultrasound image generation. Furthermore, as will be more apparent below, the imaging module 212 performs an efficient ultrasound imaging method that creates a sharp image while minimizing the number of ultrasound pulse transmissions.

In the example of FIG. 2, the control logic 105 includes modules 106-111 and 201-206 that are programmed into the FPGA that implements the control logic 105. The LVDS receiver 106 receives the LVDS signals carrying echo data from the ultrasound receiver 104, and de-serializes the echo data. The DC offset cancellation module 107 is a digital high pass filter that cancels the DC offset of the echo data. The data packing module 108 packs the echo data, which in one embodiment are carried on 64 channels, so that all of the echo data can be streamed to the personal computer 211 in real time.

In one embodiment, the data bandwidth required for streaming the 64 channels of echo data is 40.96 Gbps (64 channels×40 MSPS×16 bit), and the maximum real measured data transfer speed of a THUNDERBOLT 3.0 I/O interface is 28 Gbps. To accommodate the data transfer speed of the THUNDERBOLT 3.0 I/O interface, the data packing module 108 writes echo data carried by half of the channels (i.e. channel 1 to channel 32) to a data first in/first out (FIFO) memory 204 and buffers echo data carried by the other half of the channels (i.e. channel 33 to channel 64) to a memory 207. A data multiplexer 202 multiplexes echo data carried by the first half and the second half of the data channels to the data FIFO memory 204.

In one embodiment, the data FIFO memory 204 is internal to the FPGA that implements the control logic 105, whereas the memory 207 comprises Low Power Double Data Rate 4 (LPDDR4) dynamic random-access memory (DRAM) that is external to the FPGA. The data packing module 108 controls the operation of a memory interface module 201 to write data in and read data from the memory 207. The data packing module 108 stores echo data carried by half of the channels in the memory 207. After all the echo data in the data FIFO memory 204 have been streamed to the personal computer 211 over the THUNDERBOLT I/O interface, the data packing module 108 moves the buffered data in the memory 207 to the data FIFO memory 204 to be streamed to the personal computer 211 over the THUNDERBOLT I/O interface.

A scanline comprises data from pulse-echo sensing a line of a structure of the target along a path of the ultrasound pulse. Each scanline has corresponding sequencing parameters for configuring the analog multiplexer 102, the ultrasound transmitter 103, the ultrasound receiver 104, and the power supply circuit 121 to send an ultrasound pulse toward the target and receive a corresponding echo that is reflected from structures within the target. The sequencing parameters are stored in a sequencing parameter block random access memory (RAM) 109. The sequencing control module 110 reads the sequencing parameters from the sequencing parameter block RAM 109, and sends control signals (see FIGS. 1 and 2, 130) to accordingly configure the analog multiplexer 102, the ultrasound transmitter 103, the ultrasound receiver 104, and the power supply circuit 121.

When the ultrasound imaging system 100 is not imaging, the personal computer 211 can send commands to/read data from other components of the ultrasound imaging system 100, such as the analog multiplexer 102, the ultrasound transmitter 103, the ultrasound receiver 104, and the power supply circuit 121 by way of the device control module 111. A signal multiplexer 203 multiplexes the sequencing parameters and signals from the device control module 111 on the same control signal bus.

In the example of FIG. 2, the control logic 105 further includes a Peripheral Component Interconnect Express (PCIe) Direct Memory Access (DMA) module 205 for streaming echo data from the data FIFO memory 204 over the THUNDERBOLT I/O interface. A PCIe PHY (Physical Layer) module 206 converts the echo data into electrical signals for transmission over PCIe lanes (see FIG. 2, 221). In the example of FIG. 2, there are 4 PCIe 3.0 lanes to the THUNDERBOLT controller 208. In one embodiment, the THUNDERBOLT controller 208 is implemented using the JHL7440 THUNDERBOLT 3.0 controller from the Intel Corporation.

The THUNDERBOLT controller 208 streams the echo data over a THUNDERBOLT I/O interface (see FIG. 2, 222) to the personal computer 211. In one embodiment, the THUNDERBOLT I/O interface is version 3.0. A THUNDERBOLT connector 210 is plugged into a THUNDERBOLT port 220 of the personal computer 211 to complete the THUNDERBOLT I/O interface connection. USB PD control signals (see FIG. 2, 223) are also connected to the THUNDERBOLT connector 210.

Figure 3:
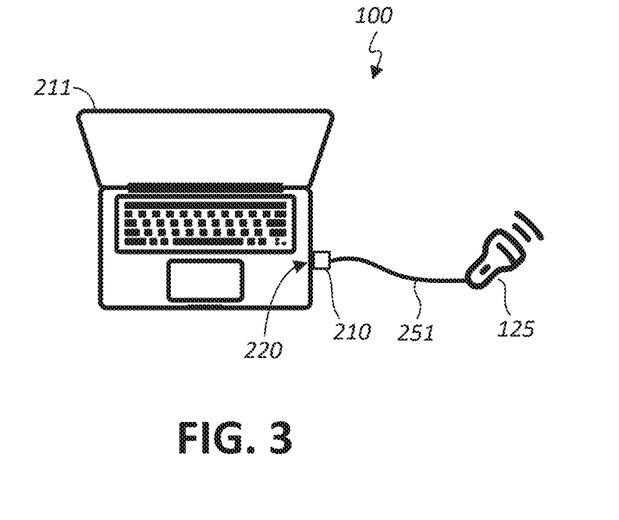
FIG. 3 shows a physical layout diagram of an ultrasound imaging system, in accordance with an embodiment of the present invention.

The design of the ultrasound imaging system 100 allows for a relatively small form factor. FIG. 3 shows a physical layout diagram of the ultrasound imaging system 100, in accordance with an embodiment of the present invention. In the example of FIG. 3, a cable 251 connects the probe 125 to the THUNDERBOLT connector 120, which plugs to the THUNDERBOLT port 220 of the personal computer 211. In the example of FIG. 3, the probe 125 includes within its housing the transducer 101 as well as the analog multiplexer 102, the ultrasound transmitter 103, the ultrasound receiver 104, the power supply circuit 121, the battery module 123, the battery 122, the USB PD controller 209, the THUNDERBOLT controller 208, and other electronic components of the ultrasound imaging system 100 except for the personal computer 211. As can be appreciated, components of the ultrasonic imaging system 100 are available in integrated circuit (IC) form or other relatively small form factor, allowing them to be housed in the probe 125.

Figure 4:
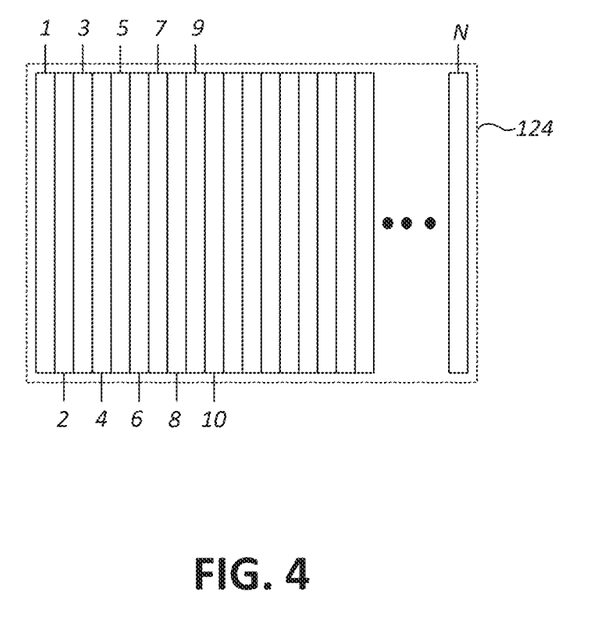
FIGS. 4-6 illustrate a method of scanning a target for ultrasound imaging, in accordance with an embodiment of the present invention.
Figure 5:
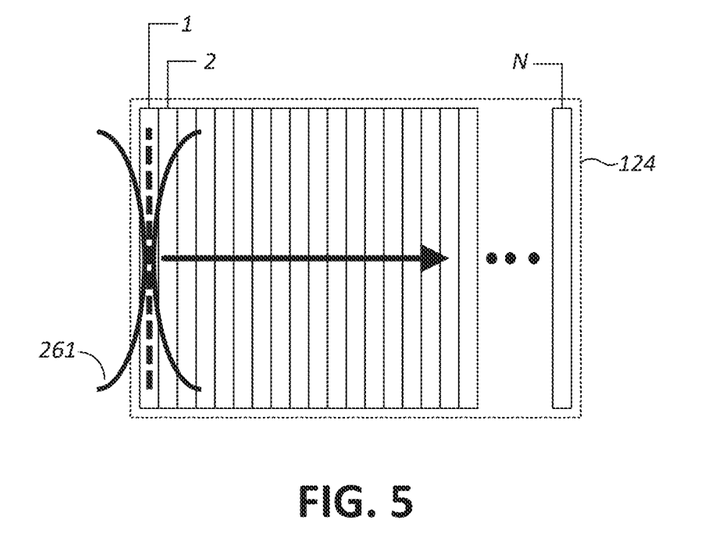
Figure 6:
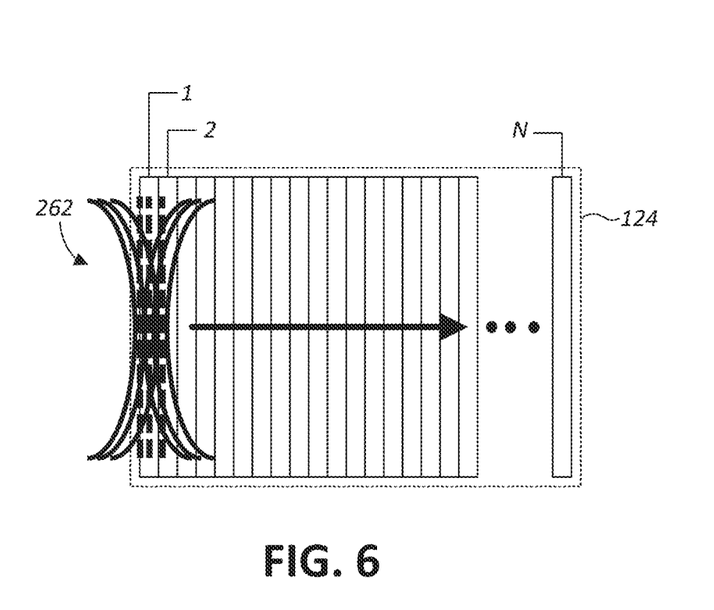

FIGS. 4-6 illustrate a method of scanning a target for ultrasound imaging, in accordance with an embodiment of the present invention. FIGS. 4-6 are described using the ultrasound imaging system 100 for ease of illustration. As can be appreciated, other ultrasound imaging systems may also be used.

In the example of FIG. 4, the target 124 is divided into positions 1, 2, 3, . . . , N. Each position may be scanned by transmitting an ultrasound pulse at the position. For example, an ultrasound pulse may be transmitted toward the position 1 to generate a scanline at position 1, another ultrasound pulse may be transmitted toward the position 2 to generate a scanline at position 2, etc. FIG. 5 shows a scanline 261 that is generated from transmitting an ultrasound pulse at position 1 of the target 124. The target 124 is scanned from left to right.

In conventional ultrasound harmonic imaging, each position is scanned twice: once with a positive ultrasound pulse and another with a negative ultrasound pulse, where the negative ultrasound pulse is an inverted version of the positive ultrasound pulse. The target is scanned from position 1 to position N, thus requiring 2N transmissions of ultrasound pulses to image the target. The echoes from the positive and negative pulses are summed to extract harmonic signals that are used to generate the ultrasound image.

FIG. 6 illustrate scanning a target with ultrasound pulses for spatial compounding. In the example of FIG. 6, the position 1 is scanned with an ultrasound pulse at a fundamental frequency. From a single transmitted ultrasound pulse, a scanline at position 1 and several scanlines around (i.e., near or in the vicinity of) the position 1 are generated by parallel dynamic receive focusing (see FIG. 6, 262). Generally, dynamic receive focusing involves constantly adjusting the timing delay of the echo signals to focus on all imaging depths. Using position 1 as an example, after the ultrasound pulse is transmitted to scan the position 1, resulting echoes are sampled from all elements of the transducer 101. The dynamic receive focusing process is performed, in parallel, for the scanline at position 1 and P additional scanlines around the position 1. These P additional scanlines are generated using the same delay-and-sum as the scanline at position 1. The parallel dynamic receive focusing process is performed as the target is scanned from position 1 to position N, thus requiring N transmissions of ultrasound pulses to image the target. The scanlines are coherently summed together to generate the ultrasound image.

Figure 7:
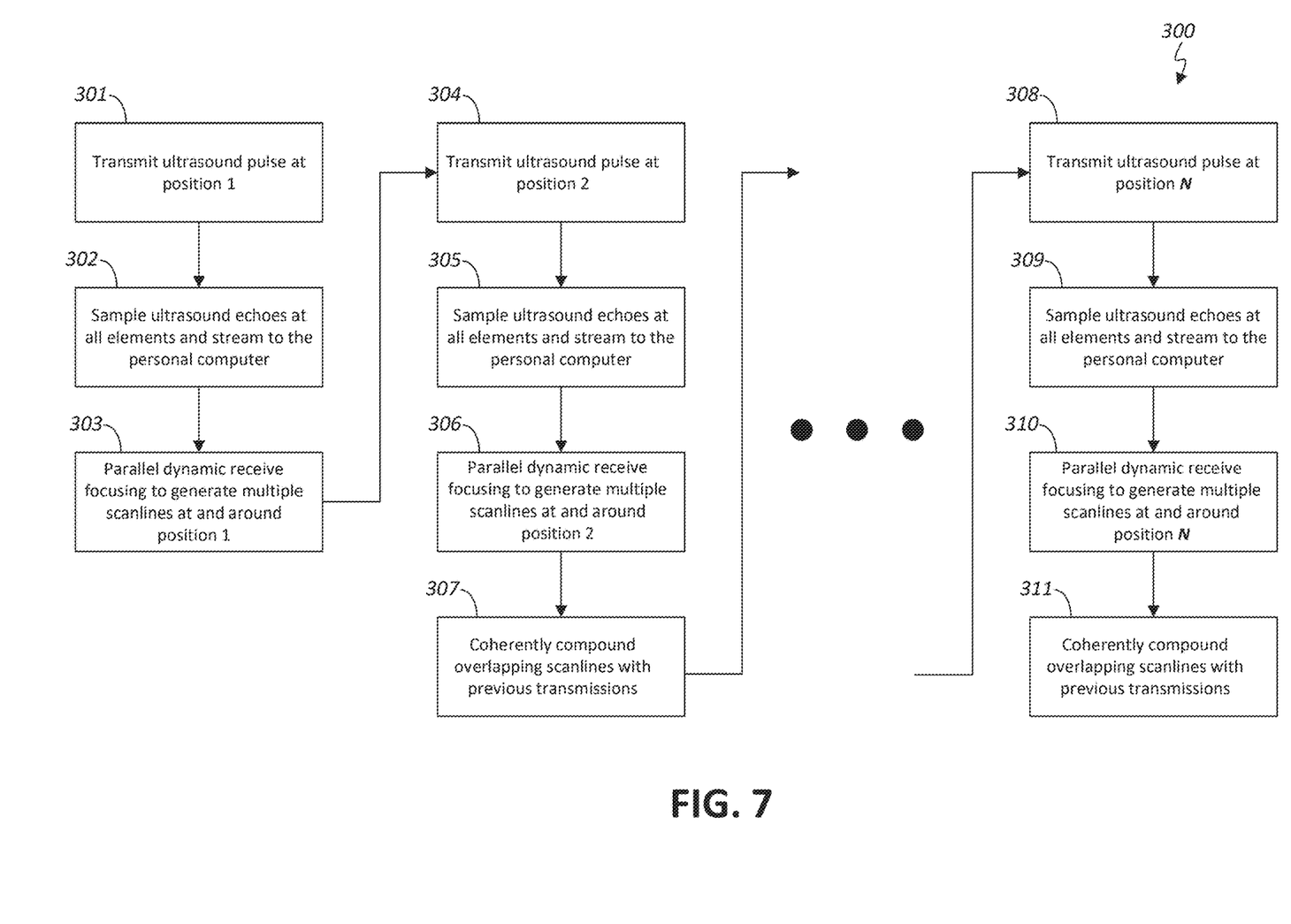
FIG. 7 shows a method of generating an ultrasound image, in accordance with an embodiment of the present invention.

FIG. 7 shows a method 300 of generating an ultrasound image, in accordance with an embodiment of the present invention. The method 300 may be performed by the ultrasound imaging system 100 to generate an ultrasound image by spatial compounding.

In step 301, an ultrasound pulse at a fundamental frequency is transmitted at position 1 of the target. In step 302, resulting echoes are sampled from all elements of the transducer 101, the sampled echoes are digitized into echo data, and the echo data are streamed to the personal computer 211. In step 303, the imaging module 212 generates multiple scanlines at and around position 1 from the echo data by parallel dynamic receive focusing using the GPU 213 of the personal computer 211.

In step 304, an ultrasound pulse at the fundamental frequency is transmitted at position 2 of the target. In step 305, resulting echoes are sampled from all elements of the transducer 101, the sampled echoes are digitized into echo data, and the echo data are streamed to the personal computer 211. In step 306, the imaging module 212 generates multiple scanlines at and around position 2 from the echo data by parallel dynamic receive focusing using the GPU 213 of the personal computer 211. In step 307, scanlines that overlap with scanlines of previous transmissions are coherently compounded. More particularly, overlapping scanlines at the same position of the target are summed together to form a compounded scanline. The steps 304-307 are repeated to scan the target from position 3 to position N. Steps 308-311 are the same as steps 304-307 to generate multiple scanlines at and around position N. The method 300 thus requires N transmissions of ultrasound pulses. Scanlines, including the compounded scanlines, are formed together to generate the ultrasound image.

Figure 8:
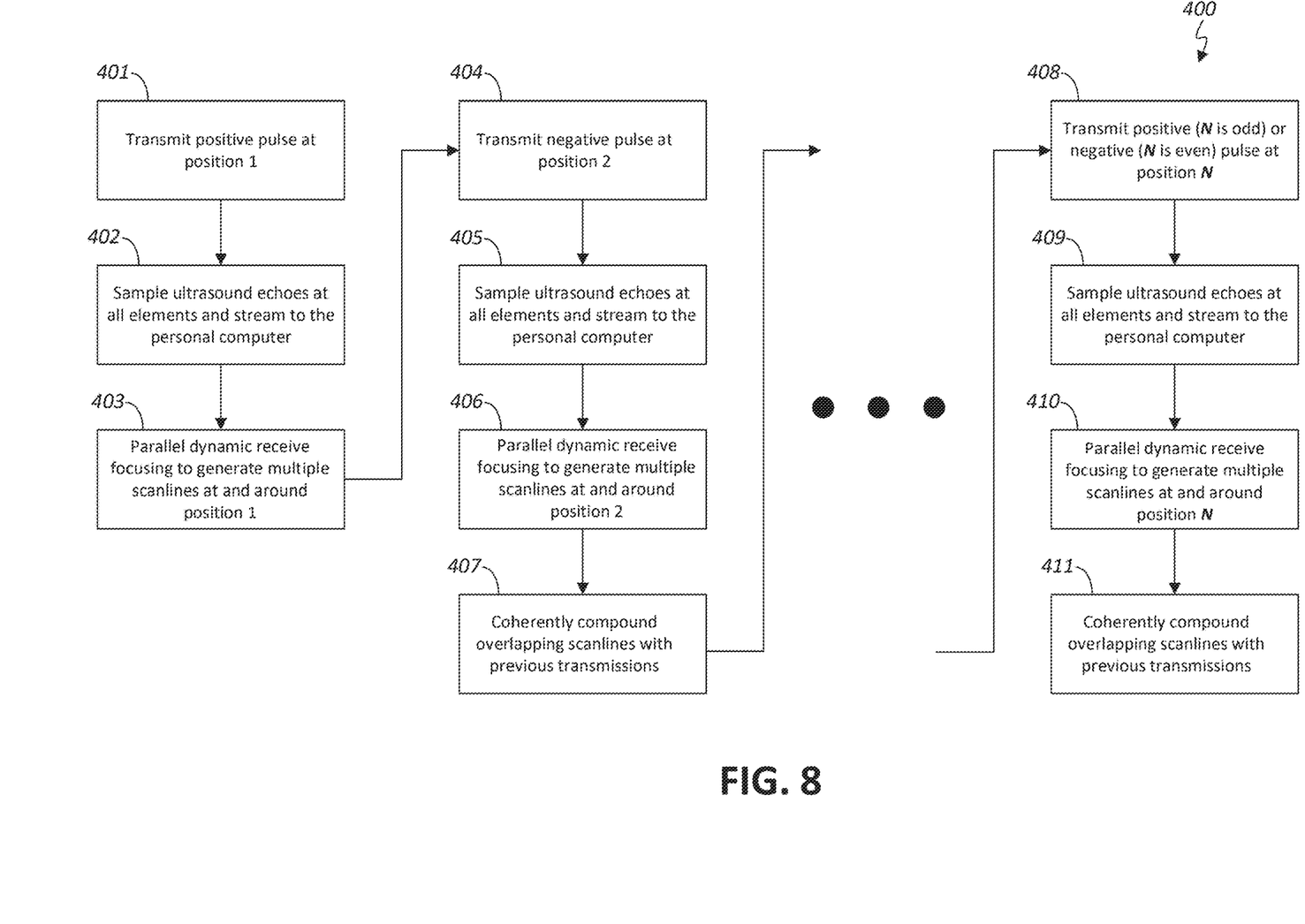
FIG. 8 shows a method of generating an ultrasound image, in accordance with another embodiment of the present invention.

FIG. 8 shows a method 400 of generating an ultrasound image, in accordance with an embodiment of the present invention. The method 400 may be performed by the ultrasound imaging system 100 to generate an ultrasound image by spatial compounded harmonic imaging.

In step 401, a positive ultrasound pulse is transmitted at position 1 of the target. In step 402, resulting echoes are sampled from all elements of the transducer 101, the sampled echoes are digitized into echo data, and the echo data are streamed to the personal computer 211. In step 403, the imaging module 212 generates multiple scanlines at and around position 1 from the echo data by parallel dynamic receive focusing using the GPU 213 of the personal computer 211.

In step 404, a negative ultrasound pulse is transmitted at position 2 of the target. The negative ultrasound pulse is an inverted version of the positive ultrasound pulse. In step 405, resulting ultrasound echoes are sampled from all elements of the transducer 101, the sampled echoes are digitized to echo data, and the echo data are streamed to the personal computer 211. In step 406, the imaging module 212 generates multiple scanlines at and around position 2 from the echo data by parallel dynamic receive focusing using the GPU 213 of the personal computer 211. In step 407, scanlines that overlap with scanlines of previous transmissions are coherently compounded. The steps 404-407 are repeated to scan the target from position 3 to position N of the target. In step 408, a positive ultrasound pulse is transmitted at position N when N is odd; otherwise, a negative ultrasound pulse is transmitted at position N when N is even. Steps 408-411 are otherwise the same as steps 404-407 to generate multiple scanlines at and around position N. The scanlines, including the compounded scanlines, are formed together to generate the ultrasound image. It is to be noted that the method 400 requires N transmissions of ultrasound pulses. In contrast, conventional harmonic imaging requires 2N transmissions of ultrasound pulses.

Figure 9:
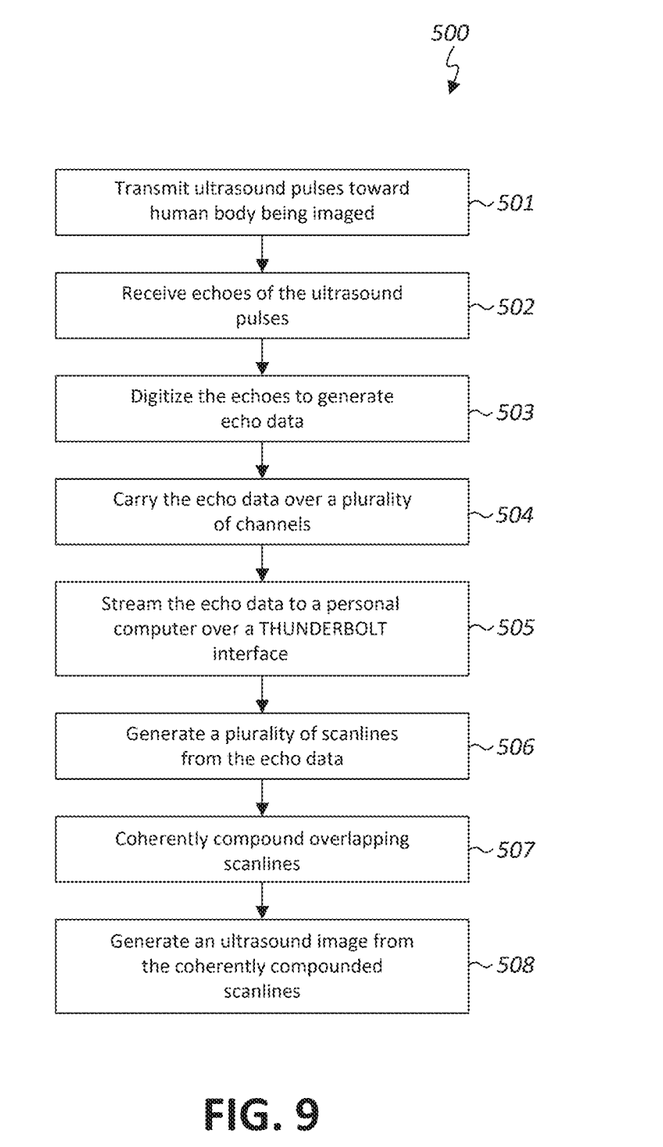
FIG. 9 shows a flow diagram of a method of generating an ultrasound image, in accordance with yet another embodiment of the present invention.

FIG. 9 shows a flow diagram of a method 500 of generating an ultrasound image, in accordance with an embodiment of the present invention. The method 500 may be performed using the ultrasound imaging system 100. As can be appreciated, other components may also be employed without detracting from the merits of the present invention.

In step 501, ultrasound pulses are transmitted toward a target that is being imaged. In one embodiment, the target is a human body and the ultrasound pulses comprise positive and negative ultrasound pulses that are alternately transmitted at different positions of the target. For example, positive ultrasound pulses are transmitted at odd positions of the target, whereas negative ultrasound pulses are transmitted at even positions of the target. Excitation signals may be sent by an ultrasound receiver to a transducer, with corresponding elements of the transducer transmitting the ultrasound pulses responsive to the excitation signals.

In step 502, echoes of the ultrasound pulses that are reflected from internal structures of the human body are received by elements of the transducer.

In step 503, the echoes are sampled from the elements of the transducer and digitized by an ultrasound receiver to generate echo data.

In step 504, the echo data are carried over a plurality of data channels between the ultrasound receiver and a control logic.

In step 505, the echo data are streamed to a personal computer over a THUNDERBOLT I/O interface. In one embodiment, echo data carried by a first set of data channels of the plurality of data channels are streamed to the personal computer over the THUNDERBOLT I/O interface, whereas echo data carried by a second set of data channels of the plurality of data channels are buffered. After the echo data carried by the first set of data channels are streamed to the personal computer over the THUNDERBOLT I/O interface, the echo data carried by the second set of data channels are streamed to the personal computer over the THUNDERBOLT I/O interface.

In step 506, in the personal computer, a plurality of scanlines are generated from the echo data. Multiple scanlines at and around a position of the target may be generated from echo data of a single ultrasound pulse transmitted toward the position by parallel dynamic receive focusing, for example using a GPU of the personal computer.

In step 507, in the personal computer, overlapping scanlines of the plurality of scanlines are coherently compounded.

In step 508, in the personal computer, the ultrasound image is generated from the coherently compounded scanlines. More particularly, coherently compounded scanlines and other scanlines are positioned together based on their positions on the target to generate the ultrasound image.

Figure 10:
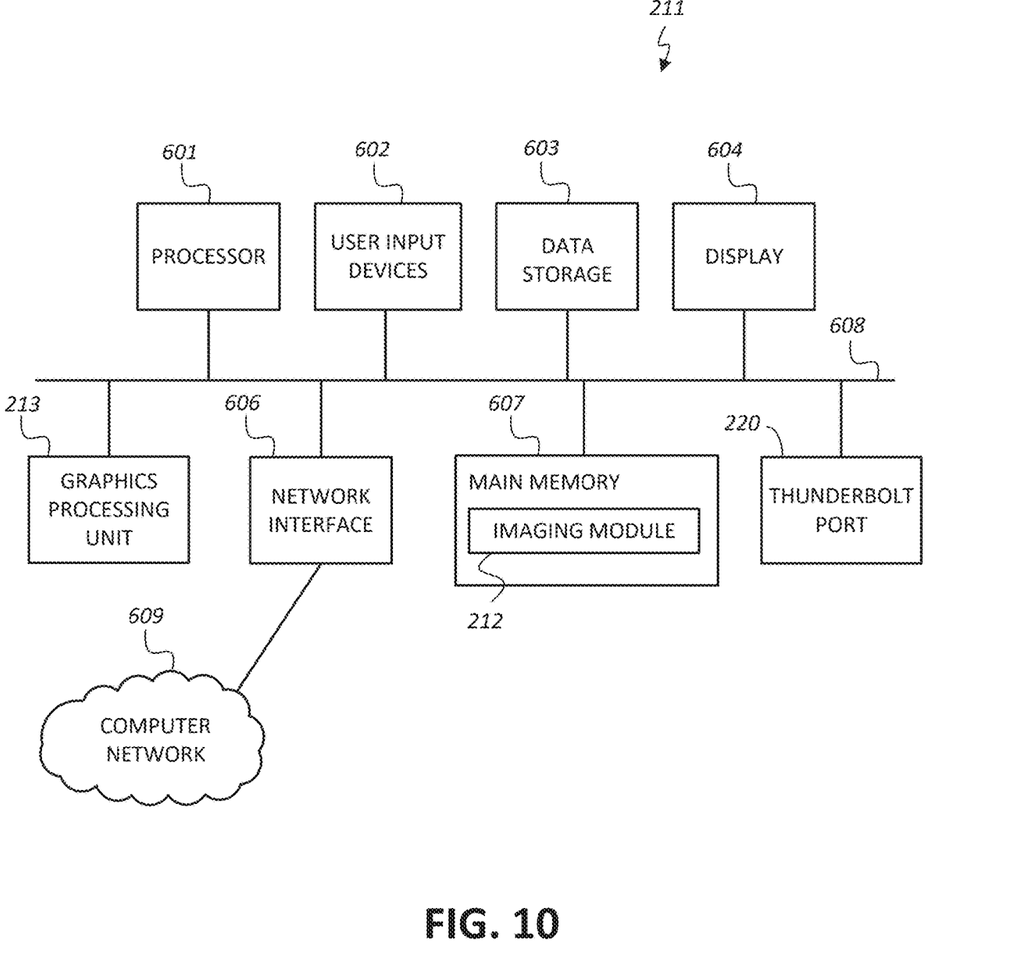
FIG. 10 shows a block diagram of a personal computer of an ultrasound imaging system, in accordance with an embodiment of the present invention.

FIG. 10 shows a block diagram of the personal computer 211, in accordance with an embodiment of the present invention. The personal computer 211 may have fewer or more components to meet the needs of a particular ultrasound imaging application. The personal computer 211 includes one or more processors 601, one or more user input devices 602 (e.g., keyboard, mouse), one or more data storage devices 603 (e.g., hard drive, solid state drive), a display screen 604 (e.g., liquid crystal display), at least one GPU 213, a computer network interface 606, and a main memory 607 (e.g., random access memory). The personal computer 211 may have one or more buses 608 coupling its various components. The computer network interface 606 may be coupled to a computer network 609.

The personal computer 211 is a particular machine as programmed with the imaging module 212, comprising instructions stored non-transitory in the main memory 607 for execution by at least one processor 601 to cause the personal computer 211 to perform corresponding programmed steps to generate an ultrasound image. An article of manufacture may be embodied as computer-readable storage medium including instructions that when executed by at least one processor 601 cause the personal computer 211 to be operable to perform the functions of the imaging module 212.

Methods and system for ultrasound imaging have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of generating an ultrasound image, the method comprising:
   transmitting a first positive ultrasound pulse to a first position of a target, wherein the target is a human body;
   receiving a first set of echoes of the first positive ultrasound pulse;

generating a first set of scanlines from the first set of echoes;

transmitting a first negative ultrasound pulse to a second position of the target, the first negative ultrasound pulse is an inverted version of the first positive ultrasound pulse;

receiving a second set of echoes of the first negative ultrasound pulse;

generating a second set of scanlines from the second set of echoes;

coherently compounding overlapping scanlines of the first and second sets of scanlines to generate coherently compounded scanlines; and forming at least the coherently compounded scanlines into an ultrasound image.

2. The method of claim 1, further comprising:

transmitting a second positive ultrasound pulse to a third position of the target;

receiving a third set of echoes of the third positive ultrasound pulse;

generating a third set of scanlines from the third set of echoes; and coherently compounding overlapping scanlines of the first, second, and third sets of scanlines to generate the coherently compounded scanlines.

3. The method of claim 1, wherein generating the first set of scanlines from the first set of echoes comprises:

sampling the first set of echoes from elements of a transducer;

streaming data of the first set of echoes to a personal computer; and in the personal computer, parallel dynamic receive focusing the data of the first set of echoes to generate the first set of scanlines.

4. The method of claim 3, wherein generating the second set of scanlines from the second set of echoes comprises:

sampling the second set of echoes from the elements of the transducer;

after streaming the data of the first set of echoes to the personal computer, streaming data of the second set of echoes to the personal computer; and in the personal computer, parallel dynamic receive focusing the second set of echoes to generate the second set of scanlines.

5. The method of claim 1, wherein the second position is to the right of the first position and the target is scanned by transmitting ultrasound pulses from left to right.

6. A method of generating an ultrasound image, the method comprising:

transmitting a plurality of ultrasound pulses toward a target, wherein the target is a human body;

receiving echoes of the ultrasound pulses;

streaming echo data of the echoes to a personal computer; and in the personal computer, generating a plurality of scanlines from the echo data, coherently compounding overlapping scanlines of the plurality of scanlines to generate coherently compounded scanlines; and forming at least the coherently compounded scanlines into an ultrasound image.

7. The method of claim 6, wherein transmitting the plurality of ultrasound pulses toward the target comprises:

alternately transmitting a positive ultrasound pulse and a negative ultrasound pulse across alternate positions of the target.

8. The method of claim 6, wherein the echo data of the echoes are streamed to the personal computer.

9. The method of claim 8, wherein the ultrasound image is generated using a graphics processing unit (GPU) of the personal computer.

10. The method of claim 6, wherein streaming the echo data of the echoes to the personal computer comprises:

digitizing the echoes of the ultrasound pulses to generate the echo data;

carrying the echo data on a plurality of channels;

buffering echo data carried by a first set of channels of the plurality of channels;

transmitting echo data carried by a second set of channels of the plurality of channels to the personal computer; and after transmitting the echo data carried by the second set of channels to the personal computer, transmitting the echo data carried by the first set of channels to the personal computer.

* * * * *